United States Patent Office 2,934,437
Patented Apr. 26, 1960

2,934,437
FLAVORING SUBSTANCES AND THEIR
PREPARATION

Ian Douglas Morton, Bedford, Philip Akroyd, Rushden, and Charles Gerard May, St. Neots, England, assignors to Lever Brothers Company, New York, N.Y., a corporation of Maine No Drawing. Application November 12, 1958
Serial No. 773,197
Claims priority, application Great Britain April 7, 1955
20 Claims. (Cl. 99—140)

The present invention relates to artificial flavoring substances and to their preparation, and is a continuation-in-part of application filed April 4, 1956, under Serial No. 575,939.

It has been found that flavoring substances capable of imparting to foodstuffs a savory smell and taste, particularly resembling that of cooked meat, may be obtained by the reaction of a monosaccharide with an amino reagent comprising cysteine or cystine in the presence of water and at an elevated temperature.

The present invention provides, therefore, a process for making a flavoring substance which comprises reacting a pentose or hexose monosaccharide with cysteine or cystine in the presence of water at an elevated temperature until a flavoring substance having the aroma and flavor of cooked meat is formed.

The monosaccharide employed in the process of this invention may be a pentose, such as ribose, arabinose, or xylose, or a hexose such as glucose. Pentoses are generally preferred to hexoses from the standpoint that pentoses give rise to flavors and aromas resembling closely those of cooked meats under less vigorous reaction conditions. If a hexose, such as glucose, is used in the absence of pentoses, a longer reaction time is required to prepare a similar flavor. It may be advantageous to use a mixture of monosaccharides which may contain either pentoses or hexoses or both. Best results are generally obtained if the monosaccharide, used alone or in admixture with other pentose or hexose monosaccharides, is ribose. Di-, tri- or polysaccharides or simple derivatives of mono-, di- or polysaccharides which yield the required monosaccharide under the conditions of the reaction may also be used. As suitable monosaccharide derivatives there may be mentioned monoacetone glucose and methyl riboside.

Flavoring substances according to the invention may be obtained by using cysteine or cystine or other simple derivatives such as salts, simple compounds such as esters or hydroxy compounds, peptides such as glutathione, or proteins which will give rise to cysteine or cystine under the conditions of the reaction, as the sole amino reagent. Either optical isomer of these compounds are suitable. For example, DL-cysteine and L-cysteine provide flavors which are indistinguishable. Generally, cysteine or derivatives giving rise to cysteine are preferred to cystine and its derivatives. More full-bodied flavors are generally obtained by using cysteine or cystine in admixture with one or more, preferably three or more, other amino acids, such as glutamic acid, glycine, α and β-alanine, threonine, histidine, lysine, leucine, iso-leucine, serine or valine. D-, tri- or higher peptides, such as glutathione, or proteins, which give rise to the requisite amino acids, may also be used in the reaction.

It has been found that fish protein is a suitable starting material for obtaining a mixture of amino acids for the reaction, provided that cysteine or cystine is added. Crude fish protein, such as cod flesh, may be used, but preferably, the fish should first be deflavored. The fish protein is then hydrolyzed, for instance, by means of hydrochloric acid or caustic soda, and substantially neutralized. The substantially neutralized hydrolysate may be used, as such, as the amino reagent, provided cysteine or cystine is added. The hydrolysate must be treated, for instance with charcoal, in order to remove phenylalanine and methionine, while cysteine or cystine or a source thereof must be added before using the mixture. The presence of substantial amounts of phenylalanine or of methionine in mixtures tend to give rise to undesirable floral or potato-like aromas and non meat-like flavors. Small amounts of other aromatic amino acids such as tyrosine and tryptophan may not be objectionable but large amounts should preferably be avoided. Other protein hydrolysates which have been suitably treated to remove phenylalanine and methionine such as groundnut hydrolysate or casein hydrolysate or mixtures of these may also be used as the amino reagent, provided cysteine or cystine is added. Pig bristle hydrolysate and hydrolyzed sheep wool may also be used. In these cases, the cystine and cysteine is preferably removed from the hydrolysate, converted to cysteine hydrochloride and added back to the hydrolysate at a preferred level.

Factors which may affect the nature and quality of the flavor produced include the nature and relative amounts of the monosaccharide and amino reagents used, the amount of water present and the time and temperature of heating. For example, to obtain a product having a flavor resembling that of cooked beef the total amino reagent should preferably contain about 1 to 3 times, by weight of cysteine, of amino acids additional to cysteine or derivatives which will give rise to such amino acids. The use of ribose and cysteine in the absence of other amino acids tends to give a flavor akin to that of pork.

The meat flavors obtained according to the process of this invention range from the preferred true flavors of cooked meats, such as roast beef, boiled beef, roast pork, and the like, to flavors which are best characterized as savory, meat-like flavors. Where cysteine is reacted with a hexose or pentose in the presence of a preferred amino acid mixture, the flavor will generally be that common to all cooked meats. Specific variations in the conditions of reaction and in the relative amounts and proportions of auxiliary amino acids will result in more specific flavors, such as that of roast beef.

Where cystine is reacted with a hexose or pentose, the flavors generally obtained are those characterized as savory and meat-like. While these flavors may not be quite as desirable as those obtained with cysteine, they are nevertheless useful for many purposes. For example, they may be mixed with the cooked meat-type flavors obtained with cysteine to provide a more complete meat flavor. In addition, they are suitable for use by themselves as flavoring agents for foodstuffs.

As little as 0.04 mole of monosaccharide per 1 mole of amino reagent may give a satisfactory flavoring substance. By "amino reagent" is meant the total of amino acids and derivatives thereof present, inclusive of cysteine and cystine. Amounts of monosaccharide up to 0.8 mole per 1 mole of amino reagent may be used but a greater amount of monosaccharide may be objectionable as it tends to give rise to excessive sweetness of flavor. Generally, it is preferred to use from 0.1 to 0.5 mole of monosaccharide per 1 mole of amino reagent.

Flavoring substances having a preferred aroma and taste are obtained when the ratio of cysteine and cystine to monosaccharide is between 0.4:1 and 2:1 by weight.

In practice, the amount of water present should be at least two or three times the amount by weight of total monosaccharide reagent. Preferably this amount is between five and twenty five times the amount, by weight, of the total monosaccharide reagent. Amounts of up to 1500 times may, however, be used.

The pH at which the reaction is carried out is not critical although the pH of the mixture at the end of the reaction must not be alkaline. It is preferred to carry out the reaction at a pH of between 3 and 6.

The reaction mixture may be in the form of a solution or in the form of a slurry or sludgy mass, depending on the concentration of reagents and on the conditions of heating. The saccharide may be brought into solution before heating is begun in order to reduce any danger of charring. Stirring of the mixed reagents may be advisable during heating to reduce the danger of local overheating. Vigorous stirring during heating may reduce the time required for completion of the reaction.

The reaction may be carried out most conveniently by heating the mixture under reflux. In the case of pentoses, the mixture is preferably maintained at its boiling point for from ¼ to 4 hours, generally at least for 1 hour. Similar results may be achieved with pentoses by heating for a longer period at a lower temperature, for instance 70° C., in which case from 24 to 30 hours of heating may be required. In the case of hexoses, longer times of heating are required to obtain cooked meat-type flavors. From 2 to 60 hours of refluxing at the boiling point of the mixture is needed, optimum results being obtained generally after about 24 hours. Where lower temperatures are employed, longer heating times are necessary.

The process with either hexoses or pentoses may also be carried out under reduced pressure or under increased pressure when lower or higher temperatures will be necessary to maintain the mixture at or near its boiling point. A reflux condenser is normally fitted to the reaction vessel while the reaction is in progress. Conditions of heating should be such as to avoid substantial caramelization of the mixture.

The reaction may also be carried out by adding the reagents to a food product in which it is desired to incorporate a savory or meat-like flavor and heating the product to effect reaction, for instance by autoclaving in a sealed can. When carrying out the reaction by adding the reagents to a food product it may be necessary to add a small amount of water, but generally such products will already contain sufficient water to enable the reaction to proceed.

The reaction products may be used as such, or they may be converted to freeze dried powders. Such powders may tend to be hygroscopic.

Flavoring substances according to the invention may be incorporated in a wide range of meat or meat-like products. They may, for example, be incorporated either as solutions or powders, as is convenient, in protein gels, in luncheon meats, in dry soup mixes and in meat spreads.

It is preferred to let the flavoring substance age for about a week after its preparation, when optimum flavor is generally developed. The flavoring substance may tend to lose quality after about a month from its preparation. In the absence of air and light the substance or products in which it has been incorporated tend to retain their quality of flavor longer. Freeze-dried powders generally retain quality of flavor for a longer period than solutions.

The following examples illustrate the invention.

*Example 1*

The following substances were mixed by stirring in a reaction vessel:

| | Grams |
|---|---|
| Water | 360 |
| D-ribose | 15 |
| D-glucose | 18 |
| β-Alanine | 7 |
| L-cysteine | 10 |
| L-glutamic acid | 15 |
| Glycine | 5 |

The vessel was then heated under reflux for 2 hours by means of an oil bath at 130° C. After cooling the product to room temperature and keeping in a closed vessel for 2 days, it was then brought to a pH of 6.6–6.8 by addition of alkali. This brown-colored solution had a taste and aroma resembling cooked beef; a portion was dried by freeze-drying and the flavoring solution obtained later by reconstituting the powder with water.

*Example 2*

The following substances were mixed and then treated in exactly the same manner as detailed in Example 1:

| | Grams |
|---|---|
| Water | 100 |
| D-ribose | 5 |
| Glutathione (γ-glutamylcysteinylglycine) | 10 |

The product, an orange-colored, clear solution, had a taste and aroma resembling that of cooked beef.

*Example 3*

The following substances were mixed and then treated in exactly the same manner as detailed in Example 1:

| | Grams |
|---|---|
| Water | 300 |
| D-ribose | 3 |
| L-cysteine | 9 |

The product, a pale yellow colored solution, had a taste and aroma resembling that of cooked pork.

*Example 4*

Crude cod fish flesh (30 grams) was hydrolyzed by refluxing with 6 N-hydrochloric acid (200 grams) for 8 hrs., then the acid was substantially distilled off at reduced pressure and the residual hydrolysate filtered and brought to pH=6.7 with caustic soda. The dark colored solution of low molecular weight amino compounds was then passed through a short column (3″ x 2″) of activated charcoal, giving a water-white solution. This solution (300 cc., containing 4.2 mg. of Kjeldahl nitrogen/cc.) was then heated to boiling for 3 hr. after adding D-ribose (5 g.) and L-cysteine (3 g.), a reflux condenser being fitted to the vessel. After cooling the product to room temperature and keeping it for several days to "age" and mellow the flavor, it was adjusted to pH=6.6–6.8 by addition of alkali. The deep-orange colored solution had a strong taste and aroma resembling cooked beef.

Further experiments were carried out using deflavored soya bean protein (30 g.) in place of the crude cod fish flesh, and deflavored cod fish flesh (30 g.) in place of the crude cod flesh. In both instances, a product having a strong taste and aroma of cooked meat was obtained.

*Example 5*

Commercially available charcoal-treated hydrolyzed (casein plus groundnut protein) powder (4 g.) and L-cysteine (2 g.) and D-glucose (1 g.) and D-xylose (1 g.) and water (100 g.) in a vessel fitted with a reflux condenser were heated to boiling for 3 hr. After cooling the product to room temperature, it was brought to pH=6.7 by addition of alkali. The brown-colored solution had an aroma and taste resembling cooked meat.

Example 6

Cod flesh solution prepared by hydrolysis followed by charcoal treatment, as described in Example 4 (50 cc.) and D-ribose (0.8 g.) and L-cysteine (0.6 g.) were added to a bland protein paste prepared from deflavored groundnut protein (140 g.) and water (370 g.) in a can. The can was then sealed and autoclaved for 1½ hr. at 10 pounds per square inch steam pressure. The can was opened after 6 weeks' storing and the contents had a beef-like flavor.

This example was repeated using a deflavored soya bean protein paste in place of groundnut protein paste and a similar tasting product was obtained.

Example 7

Crude keratin protein in the form of pigs' skin and bristle scrapings was washed with water and then hydrolyzed by heating with 20% hydrochloric acid for 8 hours at 100° C. After evaporation of most of the acid, the residual paste was neutralized by addition of caustic soda solution, stood for 3 days and the liquor was separated from the dark precipitate. The latter is substantially cystine, and is separately purified and reduced by use of sodium/liquid ammonia to cysteine hydrochloride. The liquor, consisting of all the amino acids (except cystine) from the keratin was decolorized by addition of just sufficient active charcoal; this process also removed all of the aromatic amino acids. The resulting water-white solution was then spray-dried, yielding a white powder containing about 48% amino acids, 48% sodium chloride and 4% water.

A mixture of this hydrolysate powder (6.8 kg.), cysteine hydrochloride (0.8 kg.) and glucose (1 kg.) was dissolved in water (50 l.), heated under reflux to 100° C. for 24 hours, then cooled to room temperature and allowed to "age" for 2 days. The brown colored solution had an excellent savory aroma and taste, resembling roast meat. It was spray-dried to a pale-yellow, stable powder.

Example 8

A mixture of 300 mgms. spray-dried hydrolyzed pigs' bristle powder prepared as described in Example 7, 36 mgms. of cysteine hydrochloride, 45 mgms. of hexose and 3 cc. of water were heated at 100° C. under reflux for 24 hours.

Experiments as above were carried out using glucose, fructose, galactose and mannose as the hexose. The resulting brown solution obtained in each case had a savory meat-like flavor and could be freeze-, spray- or roller-dried to light brown powders.

We claim:

1. A process of making a meat flavor which comprises reacting a monosaccharide selected from the group consisting of pentose and hexose monosaccharides with an amino acid selected from the group consisting of cysteine and cystine in the presence of water at an elevated temperature.

2. A process according to claim 1 in which at least one additional amino acid, other than phenylalanine and methionine, is present.

3. A process according to claim 1 where at least three amino acids from the group consisting of glutamic acid, glycine, $\alpha$ and $\beta$-alanine, threonine, histidine, lysine, leucine, isoleucine and valine are present.

4. A process according to claim 1 in which the molar ratio of monosaccharide to amino reagent is from 0.04:1 to 0.8:1, by weight.

5. A process according to claim 1 in which the ratio of amino acid from the group consisting of cysteine and cystine to monosaccharide is from 0.4:1 to 2:1 by weight.

6. A process according to claim 1 in which the amount of water present is at least 5 times, by weight, the amount of monosaccharide present.

7. A process according to claim 1 which is carried out at a pH between 3 and 6.

8. A process of making a meat flavor which comprises reacting ribose with an amino acid selected from the group consisting of cysteine and cystine in the presence of a large excess of water at an elevated temperature.

9. A process according to claim 8 in which at least one amino acid of the group consisting of glutamic acid, glycine, $\alpha$ and $\beta$-alanine, threonine, histidine, lysine, leucine, isoleucine and valine is present.

10. A process according to claim 8 in which the ratio of the amino acid selected from the group consisting of cysteine and cystine to ribose is between 0.4:1 and 2:1 by weight.

11. A process of making a meat flavor which comprises reacting xylose with an amino acid selected from the group consisting of cysteine and cystine in the presence of a large excess of water at an elevated temperature.

12. A process according to claim 11 in which at least one amino acid of the group consisting of glutamic acid, glycine, $\alpha$ and $\beta$-alanine, threonine, histidine, lysine, leucine, isoleucine and valine is present.

13. A process for imparting a meat flavor to a food product which comprises mixing with the food product a minor proportion of the monosaccharide selected from the group consisting of pentoses and hexoses, a minor proportion of an amino acid selected from the group consisting of cysteine and cystine, and a large excess of water, and heating the mixture.

14. A process of making a meat flavor which comprises reacting a monosaccharide selected from the group consisting of pentose and hexose monosaccharides with cysteine in the presence of water at an elevated temperature.

15. The process of claim 14 in which at least one amino acid from the group consisting of glutamic acid, glycine, $\alpha$ and $\beta$-alanine, threonine, histidine lysine, leucine, isoleucine, serine and valine is present in the reaction mixture during the reaction.

16. A process of making a meat flavor which comprises reacting xylose with cysteine and at least one other amino acid selected from the group consisting of glutamic acid, glycine, $\alpha$ and $\beta$-alanine, threonine, histidine, lysine, leucine, isoleucine, serine and valine in the presence of water at an elevated temperature.

17. The process of claim 16 wherein the ratio of cysteine to additional amino acids in the reaction mixture is from about 1:1 to 1:3 by weight.

18. A novel flavoring substance adapted to impart the flavor and aroma of meat to foodstuffs comprising the product of the reaction of a monosaccharide selected from the group consisting of pentose and hexose monosaccharides with an amino acid selected from the group consisting of cysteine and cystine in the presence of water at an elevated temperature.

19. A novel flavoring substance adapted to impart the flavor and aroma of meat to foodstuffs comprising the product of the reaction of a monosaccharide selected from the group consisting of pentose and hexose monosaccharides with cysteine in the presence of water at an elevated temperature.

20. A novel food product having the flavor and aroma of meat, said flavor and aroma having been developed by adding a monosaccharide selected from the group consisting of pentose and hexose monosaccharides and an amino acid from the group consisting of cysteine and cystine to the food product and subjecting the food product to an elevated temperature in the presence of water.

References Cited in the file of this patent

UNITED STATES PATENTS 2,103,495   Ruckdeschel   Dec. 28, 1937

FOREIGN PATENTS 107,367   Great Britain   Mar. 18, 1918

OTHER REFERENCES

"The Chemistry and Technology of Food and Food Products," second edition, by Jacobs, volume I, Interscience Publishers, Inc., New York, 1951, page 215.